UNITED STATES PATENT OFFICE.

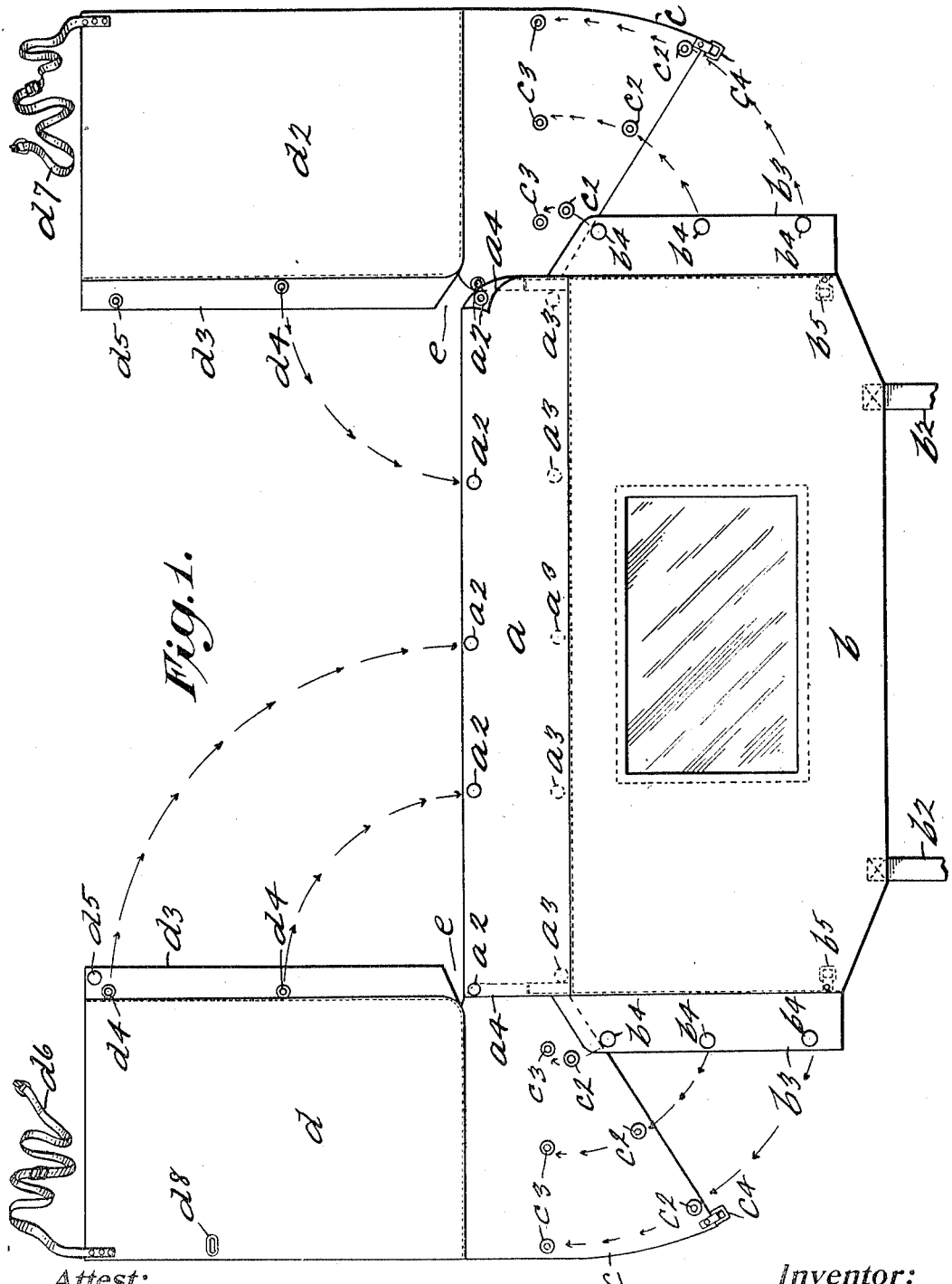

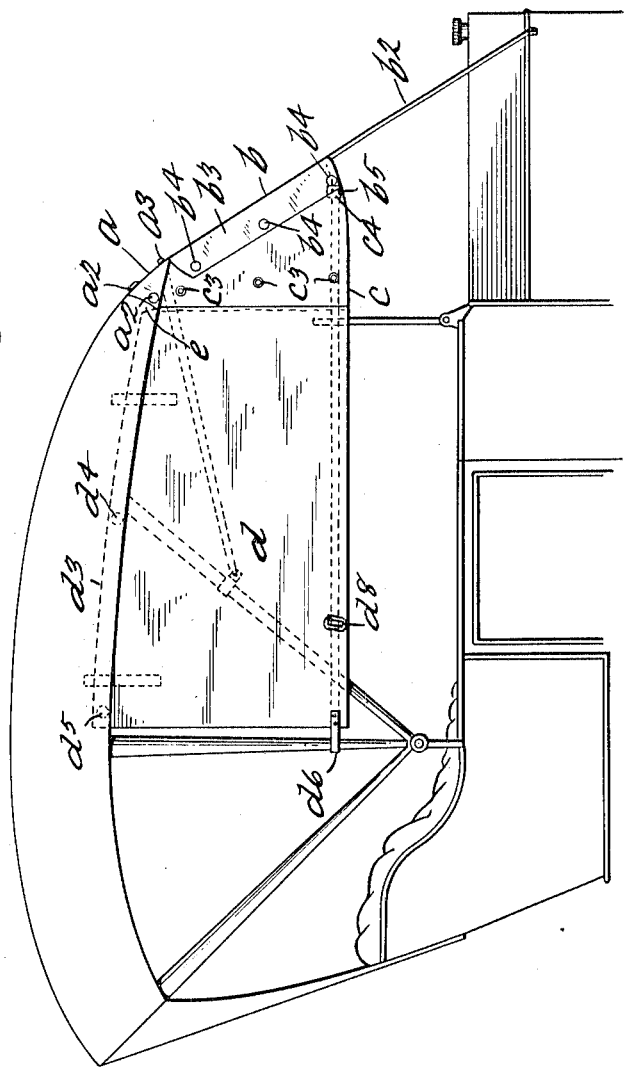

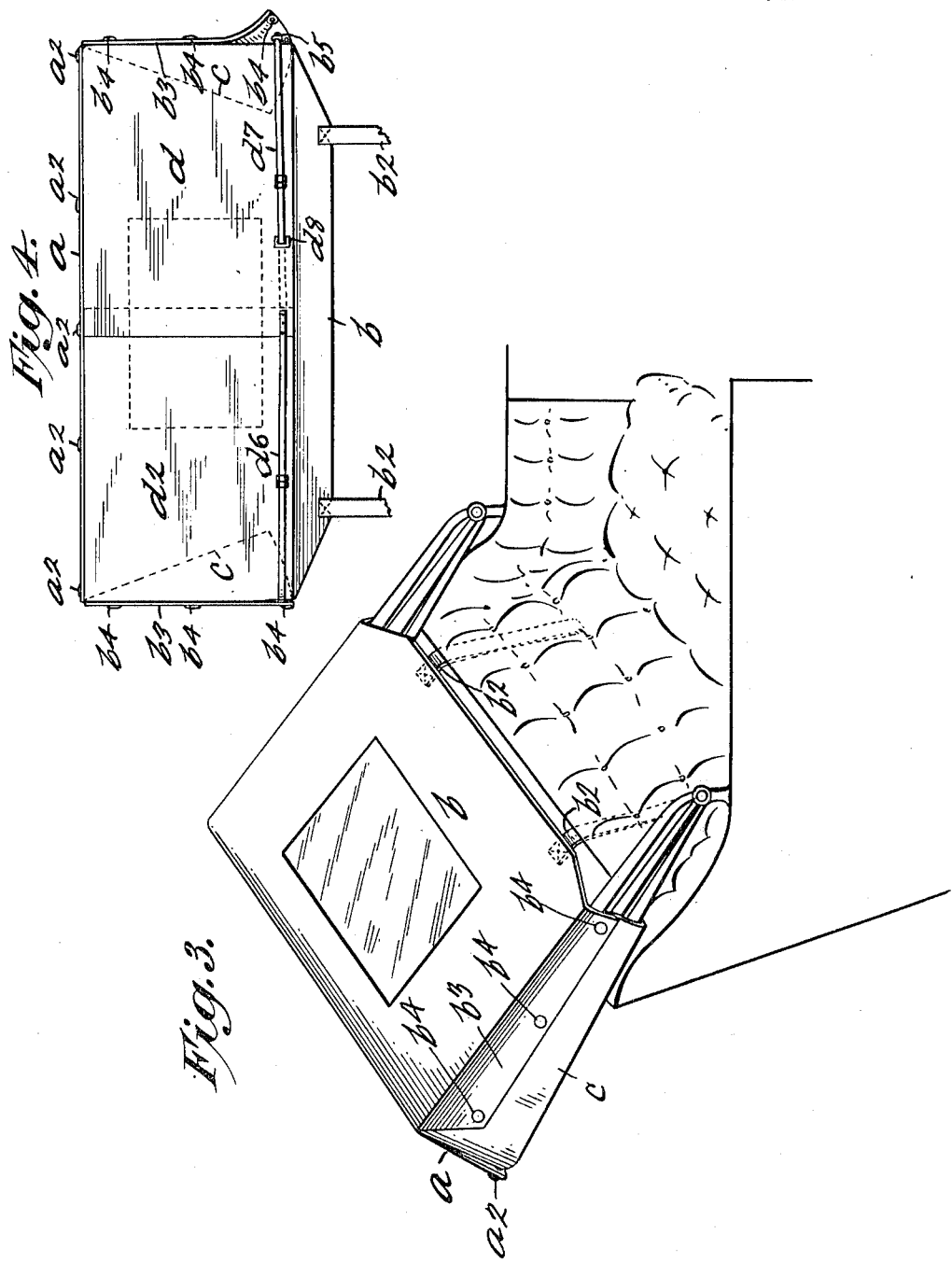

HYMAN COHEN, OF BROOKLYN, NEW YORK.

VEHICLE-TOP.

1,106,131.  Specification of Letters Patent.  Patented Aug. 4, 1914.

Application filed April 7, 1913. Serial No. 759,300.

*To all whom it may concern:*

Be it known that I, HYMAN COHEN, a subject of the Emperor of Russia, and residing at Brooklyn, in the county of Kings and State of New York, have invented certain new and useful Improvements in Vehicle-Tops, of which the following is a specification, such as will enable those skilled in the art to which it appertains to make and use the same.

This invention relates to vehicle tops, and the object thereof is to provide a hood therefor when not in use and which may be employed as a storm curtain when the top is in use, and a still further object is to adapt the same for permanent connection with said top whereby it is always ready for use for either purpose. Such hoods are usually employed on automobiles when the top is not in use but when the top is in use a storage place must be provided for the hood and separate storm curtains, entirely separate from the hood, must be employed when required but for which storage must also be provided when the top is down or when said curtains are not needed but, by means of my invention, such dual provision of hood and curtain is avoided and no storage space is needed at all for my device.

My invention is fully set forth in the following specification, of which the accompanying drawings form a part, in which the separate parts are designated by the same reference characters in each of the views, and in which:—

Figure 1 is an extended view of my invention removed from the vehicle; Fig. 2 is a view thereof on a vehicle when employed as storm curtains; Fig. 3 is a view thereof when employed as a hood; and Fig. 4 is a similar view but looking from the bottom of the hood upwardly to show the method of closing the same.

In the drawings forming a part of this application I have shown a present preferred form of embodiment of my invention, comprising a portion $a$ which may be termed a permanent portion for the reason that it is adapted to be connected directly with the vehicle top, a forwardly directed member $b$ being connected therewith and having a transparent panel and straps $b^2$, said member also having a flap $b^3$ at each side thereof provided with one member $b^4$ of each of a plurality of fasteners and having also a buckle or the like $b^5$ at each side but beneath the same, and the portion $a$ carries one member $a^2$ of a plurality of fasteners for use with the parts to be later described and with one member $a^3$ of a plurality of fasteners for connection with the vehicle top, these being merely indicated as tacks or screws may be employed instead.

Connected with each end of the permanent portion $a$ is a triangular portion $c$ preferably stitched thereto for but a portion of their contiguity whereby loose flaps $a^4$ remain and the triangular portions $c$ carry, each, one member of a plurality of fasteners $c^2$ and one member $c^3$ of another set of fasteners, these two sets being arranged in an angle to each other for a reason later explained.

Connected with the triangular portions $c$ are two wing portions $d$ and $d^2$ respectively having, each, a flap $d^3$ thereon provided with one member $d^4$ of a plurality of fasteners and each flap carries one member of a fastener $d^5$, the wing portions having, each, an adjustable strap $d^6$ and $d^7$, respectively, and the portion $d$ being further provided with a slot $d^8$ for the passage of the strap $d^6$ therethrough, and it will be seen that the triangular portions $c$ carry, each, a buckle $c^4$ and have, each, the other member of the end fasteners $a^2$ of the permanent portion $a$.

In practice I may prefer to tack or screw the permanent portion $a$ to the front edge of the vehicle top, as stated by means of the indicated fasteners $a^3$, probably with the top in use as shown in Fig. 2, thus permitting the member $b$ to be drawn downwardly and forwardly by means of the straps $b^2$ and which may be hooked to a convenient portion of the vehicle, and a front curtain results through the transparent panel of which the driver may look.

The fasteners $a^2$ at the flaps $a^4$ are usually in engagement to connect the portions $a$ and $c$ at these points, and the portions $c$ depend from the portion $a$ on either side of the vehicle, the fastener members $b^4$ being then connected with the fastener members $c^2$ with the front inclined as shown but, if it is desired to arrange the front curtain vertically, then the fasteners $b^4$ and $c^3$ are joined on either side of the vehicle, and the wing portions $d$ and $d^2$ are carried backwardly to form side curtains, the flaps $d^3$ thereof being arranged on the inner side of the vehicle top and connected therewith by means of the fastener members $d^4$ and $d^5$ and fastener members previously provided in the vehicle top, and I may also provide the straps indicated by dotted lines usually employed in vehicle tops for confining the curtains in a rolled shape at the top and out of the way, and this is true of the front curtain also although not shown, there being no novelty in rolling curtains to get them out of the way.

To prevent flapping of the wing portions $d$ and $d^2$ I pass the adjustable straps rearwardly around the bows of the vehicle top and thence forwardly and connect them with the buckles $c^4$ on the corresponding side of the vehicle and a protection of the occupants of the vehicle from storms results in the ratio of the size I make my parts, they being shown of small size with respect to the vehicle to avoid confusion of understanding of the drawings.

When it is desired to lower the vehicle top the straps $b^2$, $d^6$ and $d^7$ are disconnected, as are also the fasteners $d^4$ and $d^5$, and the fasteners $b^4$ if connected with the fasteners $c^2$, and the top may be lowered; the front portion $b$ now rests above the lowered top and covers the same, as clearly shown in Fig. 3, after which the fasteners $b^4$ are connected with those $c^3$ on either side of the vehicle thus inclosing the sides of the vehicle top, the fasteners $a^2$ at the jointure of the portion $a$ and the portions $c$ not requiring disengagement usually for the dual use of my device but they are provided, as are the adjacent slots and flaps $a^4$ for such disconnection if needed as all vehicle tops are not alike and, by reference to Figs. 1 and 2, it will be seen that the flaps $d^3$ of the wing members are free from the portions $a$, and $c$, because of the V-cuts $e$, these cuts being important in the present showing in order to pass the flaps $d^3$ inwardly of the vehicle top when in use and in order to be able to turn the portions $c$ and $d$ and $c$ and $d^2$ at right angles to each other when my device is used as a hood whereby the wing members $d$ and $d^2$, hanging loosely downwardly at this point of the description, may be folded inwardly, one over the other, beneath the vehicle top to protect the under side thereof.

By reference now to Fig. 4, which is the under side of the hood, it will be seen that the wing $d$ is extended over the wing $d^2$, the strap $d^7$ being passed through the slot $d^8$ and to the buckle $b^5$ on the opposite side of the vehicle, around the collapsed bows, and the strap $d^6$ being similarly passed around the bows on the far side and connected with the buckle $b^5$ on this side and, when the straps are adjusted, the edges of the wings bearing the straps are snugly folded. By referring again to Fig. 1 the further closure of the hood will be better understood; the fasteners $d^4$ on the wing $d$ are engaged with the fasteners $a^2$ of the permanent portion $a$, the one fastener $d^4$ on the wing $d^2$ being connected with the remaining or corresponding fastener $a^2$ between center and end of the portion $a$, and the fastener members $d^5$ of the wings $d$ and $d^2$ are joined, thus securing the wings together and to the permanent portion $a$ which now covers the rear of the vehicle top, and also to the buckles $b^5$ on the front portion $b$, and a perfect closure is provided.

In Fig. 1 I have shown direction arrows between complemental fasteners of the portion $a$ and wings $d$ and $d^2$ when my device is used as a hood with the top down and also arrows between complemental fasteners of the flaps $b^3$ and triangular portions $c$ for either use of my device but the fasteners $c^3$ are the ones employed when the device is used as a hood with the vehicle top down. When the device is used as shown in Fig. 2 the straps $d^6$ and $d^7$ appera to be connected with the buckles $b^5$, but this is not so as the straps are connected to the buckles on the triangular portions $c$, designated $c^4$, but these are confused in the drawing with the buckles $b^5$ whereas, if the front curtain is arranged vertically by connection of the fasteners $b^4$ and $c^3$, the triangular portion of the members $c$ are then folded backwardly and held in this position because of the straps $d^6$ and $d^7$, adjusted to such arrangement, and the buckles $c^4$, although the buckles $b^5$ could be used in the arrangement shown in Fig. 2. It has not been deemed necessary to multiply the number of drawings for this showing as it is more or less optional as to the arrangement of straps and buckles as equivalents thereof might readily be substituted therefor. Further, inasmuch as vehicle tops vary in shape and construction, I do not desire to limit myself to any specific form, what is sought to be protected being the dual use of the device, as well as the adaptability to permanent connection with the vehicle top, but a sufficiently practical structure is shown and described for a full comprehension.

Having fully described my invention, what I desire to claim, and secure by Letters Patent, is:—

1. A combined vehicle hood and storm curtain, comprising a permanent portion, means for securing the same to a vehicle top at the front edge thereof, front and side members in permanent connection with said permanent portion, means for holding said front and side members together to serve as curtains when the top is up, and means for connecting said side members to said permanent portion when said top is down, said permanent portion forming the back, said front member the top, and said side members the sides and bottom of a hood when said top is down.

2. A combined hood and storm curtain, comprising a permanent portion connected with the front edge of a vehicle top, a front member connected therewith, a side member at each end of said permanent portion, a wing connected with each side member, means for connecting said front and side members and means for connecting said wings with the top, said permanent portion forming the back, said front member the top, said side members the sides, and said wings the bottom of a hood when said top is down.

3. A combined hood and storm curtain, comprising a permanent portion connected with the front edge of a vehicle top, a front member connected therewith, a side member at each end of said permanent portion, a wing connected with each side member, means for detachably connecting said front and side members, means for detachably connecting said wings with said vehicle top on the inner side thereof, with said permanent portion and side members on the outer side of said top, means for holding said side and wing members to the bows of the top, and means for fastening said wing members together and to said permanent portion when the device is used as a hood, said permanent portion serving as the back, said front member as the top, said side members as the sides and said wings as the bottom of said hood, when so employed.

4. A combined hood and storm curtain, comprising a permanent portion connected at its front edge with the front edge of a vehicle top to overlay the same when said top is up, front and side members in connection therewith to serve as curtains when said top is up, said permanent portion serving as the back, said front and side members as the top, sides and bottom when used as a hood, and fasteners for said members for each use as a hood or storm curtain.

In testimony that I claim the foregoing as my invention I have signed my name in presence of the subscribing witnesses this 3rd day of April 1913.

HYMAN COHEN.

Witnesses:
 ROBT. B. ABBOTT,
 J. C. LARSEN.